United States Patent Office 2,977,368
Patented Mar. 28, 1961

2,977,368

CERTAIN 3-AMINOPHENYL-MERCAPTO PYRIDINES

Jean Druey and Konrad Meier, Riehen, Switzerland, assignors to Ciba Pharmaceutical Products Inc., Summit, N.J., a firm No Drawing. Filed Feb. 5, 1959, Ser. No. 791,272

Claims priority, application Switzerland Apr. 14, 1958

9 Claims. (Cl. 260—294.8)

The present invention provides amino-phenylmercaptopyridines of the formula

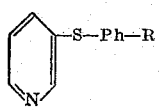

in which Ph indicates a phenylene radical and R a free or substituted amino group, and also their salts and a process for the manufacture thereof.

In these compounds the phenylene radical, which preferably contains the amino group in p-position to the mercapto group, can contain further substituents, especially halogen atoms, such as chlorine or bromine, low alkyl or alkoxy groups, principally methyl or methoxy or amino groups. Substituted amino groups include especially amino-low alkyl-amino groups, preferably tertiary amino-low alkyl-amino groups, such as di-low alkyl-amino-low alkyl-amino groups, for example the β-dimethylamino- or diethylamino-ethyl- or propylamino group or an alkyleneamino-lower alkyl-amino group the alkylene radical of which may be interrupted by a hetero atom, such as oxygen, sulfur or nitrogen, such as a pyrrolidino, piperidino, piperazino or morpholino lower alkyl-amino group.

The new compounds have a sedative effect and can be used as medicaments, for example for achieving tranquilization.

Of especial value is 3-(p-amino-phenylmercapto)-pyridine of the formula

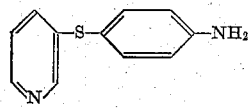

and also 3-(p-amino-o-chloro-phenylmercapto)-pyridine, and their salts.

The new compounds are made by methods in themselves known. Thus, a compound of the formula

and a compound of the formula Y—Ph—Z, in which formulae X and Y represent reactive substituents capable of splitting off during the reaction to link together the two cyclic radicals by a sulfide linkage —S—, and Z represents R or a substituent convertible into R, are reacted together, and, when the resulting compound contains a substituent convertible into R, the said substituent is so converted, and/or in a compound with a free amino group the latter is substituted in a manner known per se, e.g. is converted into an amino-lower alkylamino group. In these compounds one of the radicals X and Y advantageously represents a free mercapto group, if desired, in the form of a metal salt, such as an alkali metal or alkaline earth metal salt, and the other represents an exchangeable substituent, such as an activated halogen atom, especially chlorine or bromine. A substituent Z convertible into R is, for example, a substituent convertible into an amino group by reduction or hydrolysis, such as a nitro, acyl-amino or azo group. As acylamino groups there may be mentioned more especially lower alkanoyl amino groups, such as the acetylamino group, or carbalkoxy amino groups, such as the carbethoxy amino group.

Thus, for example, 3-mercapto pyridine, advantageously in the form of a metal salt thereof, such as an alkali metal salt, or in the presence of a condensing agent capable of forming such salt, is reacted with an appropriate halogen-phenyl compound of which the halogen atom is activated by an ortho or para-nitro group, such as an appropriate nitro-halogen benzene, for example, para-nitro-chlorobenzene or para-nitro-bromobenzene, and the nitro group in the resulting compound is subsequently reduced in known manner, for example, by catalytically activated or nascent hydrogen, to the amino group. Alternatively, a 3-halogen-pyridine, such as 3-chloro- or 3-bromo-pyridine, may be reacted with a mercapto benzene, which contains an amino group or a substituent convertible into an amino group, and which is advantageously in the form of a metal, such as alkali metal, salt thereof, or is reacted in the presence of a condensing agent capable of forming such salt, and, when the resulting compound contains a substituent convertible into an amino group, the said substituent is converted into the amino group. Preferable reaction components, are, for example, para-nitro- and para-acetylamino-thiophenol, of which the nitro and acetylamino groups, respectively, are subsequently converted in known manner into the free amino group.

In resulting compounds containing a free amino group, this can be substituted in the customary manner, for example acylated or alkylated. Thus the free amino group can be acylated, for example, by reaction with an aryl sulfonic acid halide, such as p-toluene sulfochloride, preferably in the presence of a condensing agent, such as a base, for example pyridine, then reacted in the presence of a condensing agent, such as an alkali metal hydride or amide, with an aminoalkyl halide, for example diethylaminoethyl chloride, and then from the N-aryl-sulfonyl-N-amino-low-alkyl compound the aryl sulfonyl radical split off by hydrolysis.

The reactions of this process are carried out in the customary manner, in the presence or absence or diluents and/or condensing agents or catalysts, if desired at elevated temperature, in an open or closed vessel and, if desired, under pressure.

According to the method of working the new compounds are obtained in the form of the free bases or their salts. From the salts in the customary manner the free bases can be produced, while the latter can be converted by known methods into the salts. As salts are especially concerned therapeutically useful acid addition salts or salts useful for the isolation of the free bases, such as those of the hydrohalic acids, such as hydrochloric acid, of sulfuric acid, nitric acid, phosphoric acid, perchloric acid, acetic acid, propionic acid, oxalic acid, malic acid, citric acid, tartaric acid, methane sulfonic acid, hydroxyethane sulfonic acid, amino carboxylic acids, salicylic acid, benzoic acid or benzene sulfonic acids, such as toluene sulfonic acid.

The starting materials are known or can be prepared by methods of known type. Preferably those are used which lead to the final products especially mentioned above.

The invention also comprises any modification of the process in which a compound obtainable as an intermediate at any stage of the complete process is used as starting material and the remaining step or steps are ried out, or in which the process is interrupted at any stage.

The new compounds or their salts can be used as medicaments, for example in the form of pharmaceutical preparations which contain them or their salts in admixture with a pharmaceutical organic or inorganic, solid or liquid carrier material suitable for enteral, parenteral or local administration. For the production thereof such substances are concerned as do not react with the new compounds, for example water, gelatine, lactose, starch, magnesium stearate, talc, vegetable oils, benzyl alcohols, gums, polyalkylene glycols or other known medicament carriers. The pharmaceutical preparations can be made up, for example, as tablets or dragees or in fluid form as solutions, suspensions or emulsions. If desired they are sterilized and/or contain auxiliary substances such as preserving, stabilizing, wetting or emulsifying agents, salts for variation of the osmotic pressure or buffer substances. They can also contain other therapeutically valuable substances. The preparations are produced by methods of known type.

The following examples illustrate the invention:

Example 1

49.2 grams of 3-mercapto-pyridine hydrochloride are dissolved in a solution of 39 grams of potassium hydroxide in 100 cc. of water, the solution filtered with charcoal and the clear filtrate heated for 8 hours in a steel tube to 190–195° C. with 58 grams of o-nitro-chlorobenzene and 250 cc. of dioxane.

The contents of the tube are rendered acid to Congo red with 5-N-hydrochloric acid, the dioxane distilled off under vacuum and the hydrochloric acid solution of the residue extracted with ether for removal of excess of o-nitro-chlorobenzene. Then the hydrochloric acid, aqueous solution is rendered alkaline to phenol phthalein with potassium carbonate and extracted with methylene chloride. After drying and evaporation of the methylene chloride solution, crude 3-(o-nitro-phenylmercapto)-pyridine remains, which crystallizes from methanol in brownish, compact prisms of M.P. 93–95° C.

58 grams of 3-(o-nitro-phenylmercapto)-pyridine are well triturated with 90 grams of iron powder and 60 cc. of water, the mixture stirred for 15 minutes on a boiling water bath and then 0.9 gram of ferric chloride added. After short heating of the flask with a free flame a distinct, exothermic reaction takes place. After this had subsided stirring is continued for a further 3 hours on the boiling water bath. The black mass is stirred with ether, the mixture filtered with suction from the iron and the latter washed with ether until the latter comes through colorless. The ethereal phase of the filtrate is washed with water, dried, the ether distilled off and the residue distilled under high vacuum. The 3-(o-amino-phenylmercapto)-pyridine of the formula

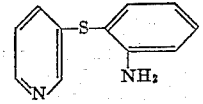

distils almost without residue at 120–124° C. under 0.07 mm. pressure as a yellowish oil which on cooling solidifies to crystals. From ether/petroleum ether it crystallizes in colorless leaflets of M.P. 58–59° C.

Example 2

14.75 grams of 3-mercapto-pyridine hydrochloride are dissolved in 12 grams of potassium hydroxide and 60 cc. of water, the solution filtered with charcoal until clear and the filtrate heated for 5 hours in a steel tube to 180–190° C. with 25 grams of p-nitro-bromobenzene and 200 cc. of dioxane. After working up as in Example 1, the crude 3-(p-nitro-phenylmercapto)-pyridine is recrystallized from methanol: M.P. 112.5–114° C.

29.2 grams of 3-(p-nitro-phenylmercapto)-pyridine are hydrogenated in 300 cc. of ethanol with 6 grams of Raney nickel. When the absorption of hydrogen is complete the catalyst is filtered off over charcoal and the filtrate concentrated. 3-(p-amino-phenylmercapto)-pyridine of the formula

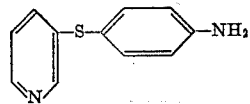

which results crystallizes in weakly yellowish, coarse needles of M.P. 88–90° C.

Example 3

14.75 grams of 3-mercapto-pyridine hydrochloride are dissolved in a solution of 12 grams of potassium hydroxide in 60 cc. of water and the solution filtered until clear over charcoal is heated for 5 hours in a tube to 150–155° C. with 25 grams of o:p-dinitro-chlorobenzene and 200 cc. of dioxane.

After working up as in Example 1, the crude 3-(o:p-dinitro-phenylmercapto)-pyridine is recrystallized from acetone. It forms compact, brown prisms of M.P. 129–131° C.

20.2 grams of 3-(o:p-dinitro-phenylmercapto)-pyridine are finely ground with 120 grams of iron powder and the mixture stirred with 50 cc. of water on the boiling water bath. After the addition of 0.5 gram of ferric chloride reaction immediately commences with foaming and gas evolution. After stirring for 1 hour on the water bath, the iron sludge is extracted with warm ethyl acetate. The combined ethyl acetate extracts are washed with water, dried and evaporated to dryness. In this manner 3-(o:p-diamino-phenylmercapto)-pyridine of the formula

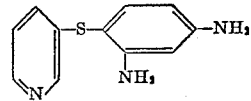

is obtained as a crystalline residue. It crystallizes from acetone/ether in brownish, compact prisms of M.P. 129.5–130.5° C.

Example 4

14.75 grams of 3-mercapto-pyridine hydrochloride are reacted as described in Example 3 with 19 grams of 2-nitro-1:4-dichlorobenzene. The resulting 3-(o-nitro-p-chloro-phenylmercapto)-pyridine distills at 163–164° C. under 0.05 mm. pressure and, when recrystallized from methanol, melts at 95–96° C.

5.3 grams of 3-(o-nitro-p-chloro-phenylmercapto)-pyridine are reduced as described in Example 3 with 15 grams of iron powder with addition of 0.1 gram of ferric chloride. The resulting 3-(amino-p-chloro-phenylmercapto)-pyridine of the formula

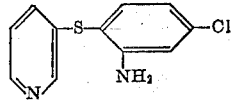

crystallizes from ethanol in orange yellow prisms of M.P. 115–117° C.

Example 5

14.75 grams of 3-mercapto-pyridine hydrochloride are reacted as described in Example 3 with 21 grams of 4-nitro-1:2-dichlorobenzene. The resulting 3-(p-nitro-o-chloro-phenylmercapto)-pyridine crystallizes from methanol in yellowish prisms of M.P. 111.5–112° C.

14 grams of 3-(p-nitro-o-chloro-phenylmarcapto)-pyridine are reduced as described in Example 3 with 55 grams of iron powder with addition of ferric chloride. After customary working up according to Example 3, the resulting crude base is distilled under high vacuum. In this manner 3-(p-amino-o-chloro-phenylmercapto)-pyridine of the formula

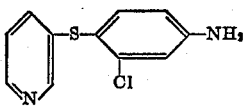

is obtained of B.P. 172–176° C. under 0.007 mm. pressure. When recrystallized from isopropyl ether, it melts at 94–94.5° C.

*Example 6*

14.8 grams of 3-mercapto-pyridine hydrochloride are converted into the potassium salt as described in Example 3 and reacted with 17 grams of m-nitro-p-chloro-toluene. The resulting 3-(o-nitro-p-methyl-phenylmercapto)-pyridine crystallizes from methanol in brown yellow, compact prisms of M.P. 83–84° C.

12.3 grams of 3-(o-nitro-p-methyl-phenylmercapto)-pyridine are reduced with iron powder as described in Example 3. In this manner 3-(o-amino-p-methyl-phenylmercapto)-pyridine is obtained of the formula

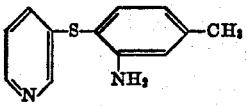

which crystallizes from acetone/cyclohexane in yellowish crystals of M.P. 102.5–103.5° C.

*Example 7*

A solution of 15 grams of 3-(o-amino-phenylmercapto)-pyridine in 20 cc. of dioxane and 12 cc. of pyridine is treated with a solution of 15 grams of p-toluene sulfonic acid chloride in 25 cc. of dioxane. The mixture becomes red colored with exothermic heating. After standing overnight it is poured into water with stirring, the crystalline tosylate precipitated is filtered off with suction, again triturated with water, again filtered with suction, dried under vacuum and recrystallized from acetone/ether. The resulting 3-(o-toluene-sulfonylamino-phenylmercapto)-pyridine melts at 127–129° C.

10.68 grams of 3-(o-toluene-sulfonylamino-phenylmercapto)-pyridine in 100 cc. of absolute dioxane are treated at 90–100° C. with 1.46 grams of powdered sodamide in portions. After stirring for 4 hours in a stream of nitrogen at 100° C., 5 grams of chlorethyl-diethylamine in 20 cc. of dioxane are added dropwise at 80° C. within ½ hour. Stirring is then continued for 5 hours at 80° C. The sodium chloride produced is filtered with suction, the filtrate evaporated under vacuum, the residue dissolved in 200 cc. of 10% acetic acid, the solution filtered with charcoal and the filtrate rendered alkaline with potassium carbonate. The precipitated base is extracted with ether and the oily residue remaining after distilling off the ether is heated for 4 hours to 125–130° C. with 75% sulfuric acid (100 grams) for splitting off the tosyl group. The mixture is poured on to ice and rendered alkaline with 10N-sodium hydroxide solution with ice cooling. The base is taken up in ether and after distilling off the solvent distilled in a bulb tube. 3-[o-(β-diethylamino-ethylamino)-phenylmercapto]-pyridine of the formula

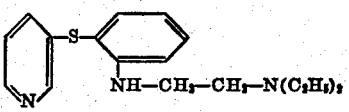

passes over as a yellowish oil at 170° C. air bath temperature under 0.05 mm. pressure. The hydrochloride, prepared in the customary manner, forms weakly yellowish crystals of M.P. 137.5–138.5° C.

What is claimed is:
1. 3-(ortho-amino-phenylmercapto)-pyridine.
2. 3-(ortho:paradiamino-phenylmercapto)pyridine.
3. 3-(para-amino-ortho-chloro-phenylmercapto) - pyridine.
4. 3-(ortho-amino-para-chloro-phenylmercapto) - pyridine.
5. 3-(ortho-amino - ortho'-chlorophenylmercapto)pyridine.
6. 3-[ortho-(diethyl - amino-ethylamino) - phenylmercapto]-pyridine.
7. 3-(ortho-nitro-phenylmercapto)-pyridine.
8. 3-(ortho-nitro-para-chloro-phenylmercapto)pyridine.
9. 3-(para-nitro-ortho-chloro-phenylmercapto) - pyridine.

References Cited in the file of this patent

Backer et al.: Chem. Abstracts, vol. 40, col. 3414 (1946).
Takahashi et al.: Chem. Abstracts, vol. 50, col. 336 (1956).